No. 855,991. PATENTED JUNE 4, 1907.
W. L. SILVEY.
PROCESS OF MAKING STORAGE BATTERY PLATES.
APPLICATION FILED APR. 2, 1906.
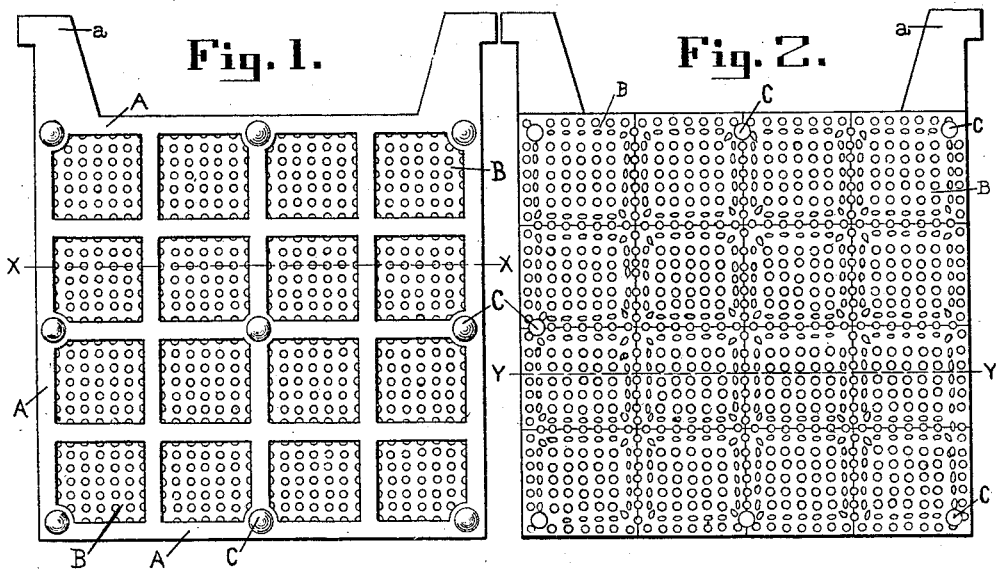
Attest
Inventor
William L. Silvey

UNITED STATES PATENT OFFICE.

WILLIAM L. SILVEY, OF DAYTON, OHIO.

PROCESS OF MAKING STORAGE-BATTERY PLATES.

No. 855,991.        Specification of Letters Patent.        Patented June 4, 1907.

Application filed April 2, 1906. Serial No. 309,478.

*To all whom it may concern:*

Be it known that I, WILLIAM L. SILVEY, a citizen of the United States, residing in the city of Dayton, county of Montgomery, and State of Ohio, have invented certain new and useful Improvements in a Process of Making Storage-Battery Plates, of which the following is a specification.

My invention relates to a process of making the battery conducting support grid or conductor in a more perfect manner than heretofore employed, whereby the plate when completed and assembled will be more durable and at the same time comparatively more simple, and cheap to construct, and one which will retain the active material more perfectly than plates heretofore made, it being understood that this plate relates to that type in which active material is mechanically applied.

Referring to the accompanying drawings which are made a part hereof, in which similar letters refer to similar parts throughout, Figure 1 is a side elevation of an improved plate constructed according to my improved process; Fig. 2 is a reverse or interior view of one-half of a plate; Fig. 3 is a horizontal cross section of a battery grid plate A with the part known as the pocket B omitted; Fig. 4 is a similar view to Fig. 3 with the perforated sheet B in an unshaped condition; Fig. 5 is a cross-section view of a punch for forming or pressing the pockets B into position in the battery grid A; Fig. 6 is a cross-section of a battery grid and pockets along the dotted line YY with the punch D pressed home; Fig. 7 represents a cross-section of an improved forming punch for pressing the perforated sheet B into position, the punch being made in two parts, a solid part H to which is fastened an elastic face E; Fig. 8 is a cross-section of a battery grid A with a perforated plate B in position ready to be pressed into shape by the punch H. E. shown in Fig. 7; Fig. 9 represents the punch H. E. the grid A and perforated pockets B pressed together, the whole resting against an anvil or punch plate F, whereby the perforated plate B is compressed into position, and level with the outside face of the plate; Fig. 10 represents a cross-section of Fig. 2 along the dotted line YY in which the grid A has the perforated sheet pockets pressed into position; Fig. 11 is a diagrammatic view of a grid showing a variety of forms which may be used for the perforations G in the grid A. Of course, the shape of the holes may be varied indefinitely. Fig. 12 is a slightly modified form of a battery grid A with the perforated sheets B in position, the same shown in section and enlarged, only two perforations G in the grid A being shown for the sake of clearness of the view.

Referring to the drawings, Figs. 1 & 2, it will be observed that the battery plate when complete is a composite one, to-wit: Two outer grids A, a set of perforated retaining pockets B for active material and active material (not shown) in the pockets. As a beginning the perforated support plate A is first cast or formed. It is composed of ribs united together as shown in the various figures with openings between the ribs which are preferably triangular shaped in section as shown in the several figures. The next operation is to prepare a sheet of perforated metal B and lay it against one side of the grid A and then subject the sheets to heavy pressure by placing the grid on the platen F of a press and forcing the perforated sheet into the opening in the grid by means of a suitable punch D as shown in Figs. 4, 5, 6 and 9, the finished grid and perforated pockets being shown in sections, Figs. 10 and 12. The holes G in the grid A may be of any convenient shape as shown in the diagram Fig. 11, but I have found that substantially square holes are most suitable on account of ease of making and from an economical standpoint, but I do not confine myself to any particular shape of holes in the grid. Sheet lead being soft and almost inelastic lends itself readily to the purpose, for as the punch D presses the perforated sheet B into the openings G in the grid A the sheet stretches so much that once the punch has reached the bottom of the stroke the perforated sheet has been formed into a series of perforated pockets with the outer face flush with the outer face of the grid as shown in Figs. 10 and 12. A plate, when thus made forms one-half of a battery grid, the other half being formed in a similar manner: the two halves are filled and then united together by lead burning or rivets C as shown in a completed plate, Fig. 1. This method of forming the plate I believe to be new. It involves placing a battery grid on a suitable platen, placing a perforated sheet in contact with one side of the grid and pressing the sheet into place using the grid for a die and a punch having a face corresponding in shape to the side of the grid. A preferable method is illustrated in Figs. 3, 7, 8 and 9. In this case the grid A is placed on a suitable press plate, anvil, or platen F, a sheet or sheets of perforated metal B placed against the side of the grid and a punch D pressed against the sheet, the punch being faced with an elastic medium E, preferably soft rubber which as soon as a certain amount of pressure is exerted causes the face to assume the shape of the unyielding part of the grid and presses the sheet into every interstice in the grid, it matters not how irregular. More than this the elastic sheet or punch avoids the necessity of making expensive dies. It is very durable and as soon as it is brought to a certain state of compression becomes almost as firm as metal, and at the same time will not tear the sheet like a metal punch. The described use of rubber is an important feature of my invention.

After the grids have been united to the perforated sheets they are filled or pasted and assembled into pairs; the active material is filled into the pockets in the perforated sheets after which they are fastened together, at which time both sides of the completed plate appear as represented by Fig. 1. Suitable ears are also provided for connecting to the external circuit.

Having fully described the principal feature of my invention, what I claim as new and wish to secure by Letters Patent in the United States, is 1. The art of making storage battery plates which consists in providing a battery grid and a perforated sheet, putting them in contact in parallel relation, and pressing the sheet into the openings of the grid and thereby fixing the grid and perforated sheet in contact and operative situation.

2. The art of making storage battery plates which consists in providing a battery grid and a perforated sheet, putting them in contact in parallel relation, and pressing the sheet by a platen of rubber or equivalent material into the openings of the grid and thereby fixing the grid and perforated sheet in contact and operative situation.

In testimony whereof, I have hereunto set my hand in the presence of two subscribing witnesses.

WILLIAM L. SILVEY.

Witnesses:
   GEO. W. FROST,
   EDWARD L. SPENCER.